United States Patent [19]

Pabst

[11] Patent Number: 4,592,848
[45] Date of Patent: Jun. 3, 1986

[54] FLOW THROUGH FILTER WITH BACKFLUSH CLEARING CAPABILITY

[76] Inventor: Richard E. Pabst, 1715 Target Ct., Houston, Tex. 77043

[21] Appl. No.: 680,399

[22] Filed: Dec. 11, 1984

[51] Int. Cl.$^4$ .................... B01D 29/06; B01D 29/38
[52] U.S. Cl. .............................. 210/798; 210/108; 210/354; 210/412; 210/423; 210/426
[58] Field of Search .............. 210/108, 354, 356, 408, 210/411, 412, 423, 426, 797, 798

[56] References Cited

U.S. PATENT DOCUMENTS

| | | | |
|---|---|---|---|
| 718,358 | 1/1903 | Kneuper | 210/356 |
| 3,276,594 | 10/1966 | Gwilliam | 210/411 X |
| 3,535,852 | 10/1970 | Hirs | 55/302 |
| 3,540,193 | 11/1970 | Pausch | 55/273 |
| 3,542,195 | 11/1970 | Sorient | 210/108 |
| 3,542,198 | 11/1970 | Borjeson | 210/111 |
| 3,556,302 | 1/1971 | Agranat | 210/356 X |
| 3,579,422 | 5/1971 | Minick et al. | 210/402 X |
| 3,581,893 | 6/1971 | Rich | 210/412 X |
| 3,598,238 | 8/1971 | Collins | 210/138 |
| 3,631,981 | 1/1972 | Young | 210/497.01 X |
| 3,637,079 | 1/1972 | Strub | 210/82 |
| 3,675,775 | 7/1972 | Obidniak | 210/138 |
| 3,834,535 | 9/1974 | Portyrata | 210/798 X |
| 3,850,803 | 11/1974 | Adams | 210/142 |
| 3,862,036 | 1/1975 | Simmons | 210/412 X |
| 3,891,551 | 6/1975 | Tiedemann | 210/82 |
| 3,907,686 | 9/1975 | Fletcher et al. | 210/259 |
| 3,994,810 | 11/1976 | Schaeffer | 210/103 |
| 4,082,665 | 4/1978 | Schneider et al. | 210/91 |
| 4,210,538 | 7/1980 | Tantillo et al. | 210/426 X |
| 4,411,792 | 10/1983 | Babb | 210/411 X |

FOREIGN PATENT DOCUMENTS 1276086 10/1961 France .......................... 210/412

OTHER PUBLICATIONS

NASA, "Self-Cleaning Tubular-Membrane Module", NASA Tech Brief, vol. 7, No. 3, M. N. Sarbolouki (Spring 1983).
Norton, "Ceraflo" Ceramic Microfilter brochure (1984).
Osmonics, Inc., brochure on "OSMO Sepralator".
Mott Metallurgical Corp, "Application and Product News" (1984).

Primary Examiner—Robert Spitzer
Attorney, Agent, or Firm—Patrea L. Pabst; Michael J. Bevilacqua

[57] ABSTRACT

A flow-through filter including a two-stage valve head assembly and a filtering body which is designed to provide a helical flow path for the solution over a cylindrical porous filter which captures the particulate matter contained by the solution being filtered. An extended filtering capacity is achieved due to the ability of the filter to remove and eject separated solids retained by the porous filter. An expander tube is positioned within the filter and, when connected to a pressure source, the expander tube forces solids from the pores and into the primary volume of the filter where a flushing medium is circulated. The filter clearing is made possible by an accurately controlled and metered volume of uniformly distributed reverse flow which effectively lifts the solid material out of the pores.

27 Claims, 25 Drawing Figures

DECK A

DECK B

DECK B

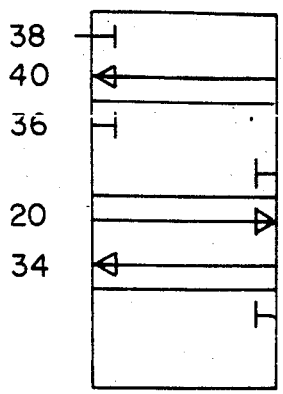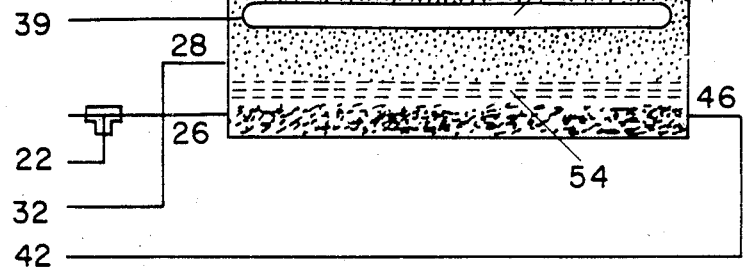
FIGURE 5
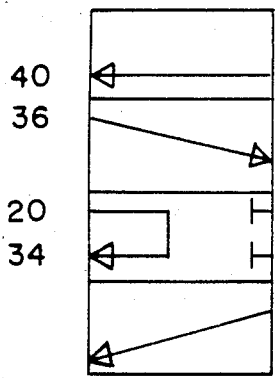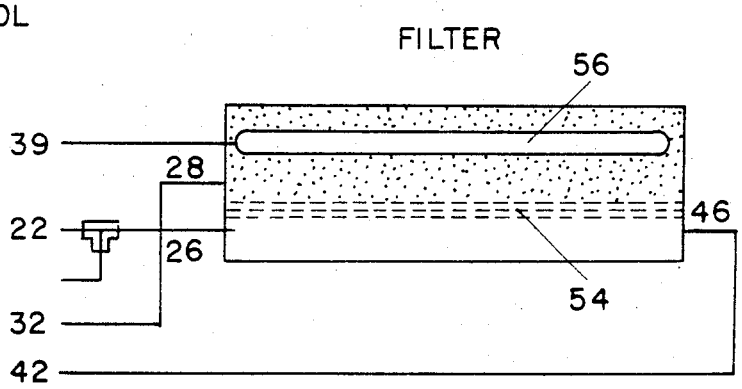
FIGURE 6
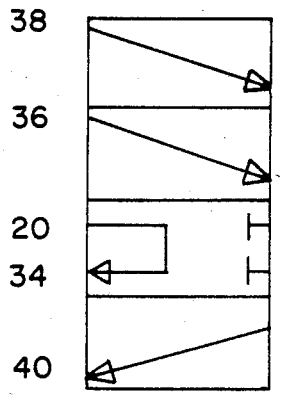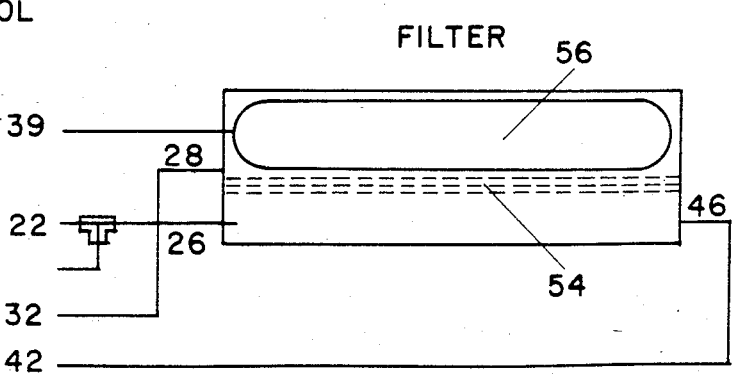
FIGURE 7

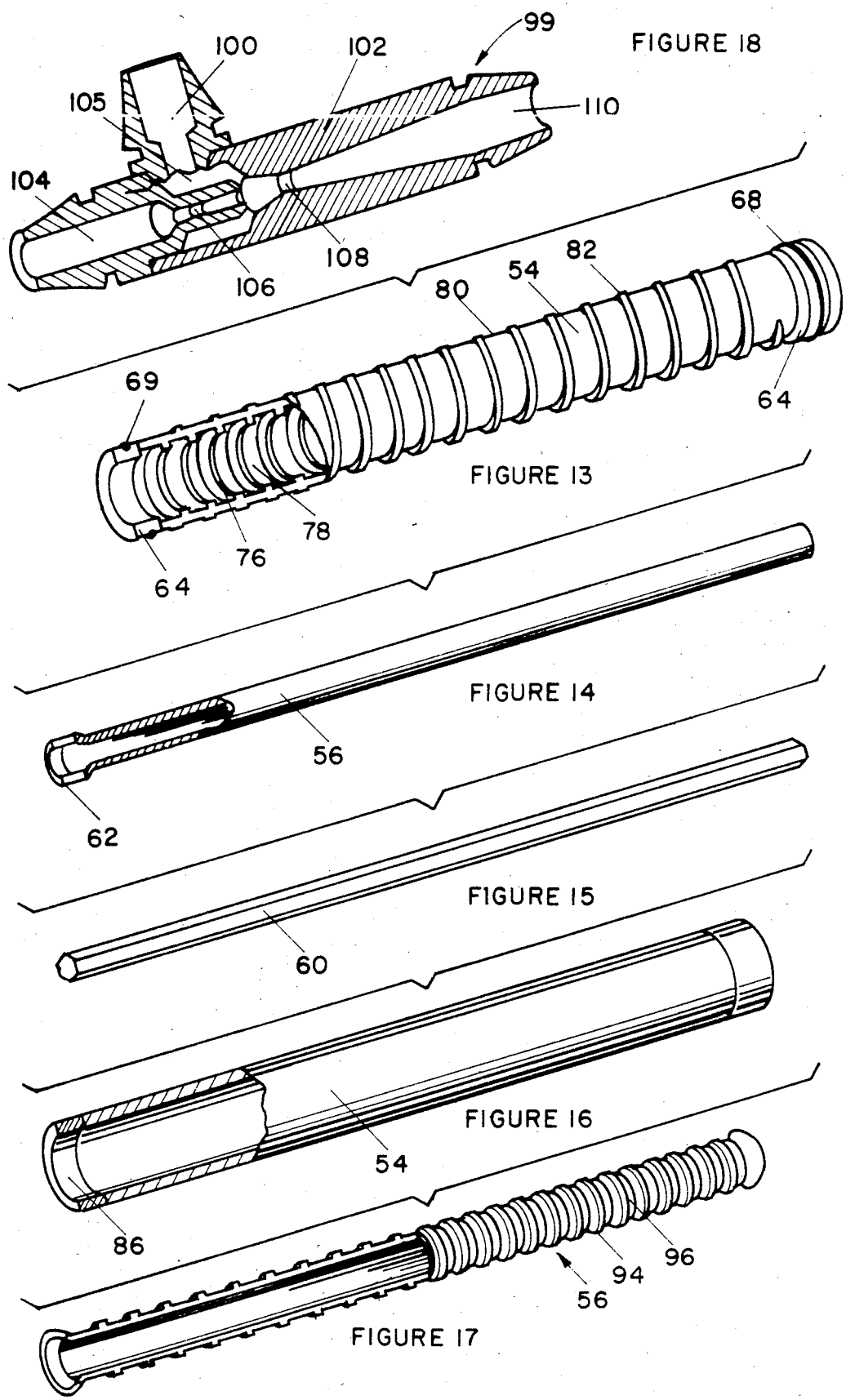

FLOW THROUGH FILTER WITH BACKFLUSH CLEARING CAPABILITY

THE BACKGROUND OF THE INVENTION

Many different types of filtration apparatus have been used to remove suspended particles from solutions. Conventional filtering equipment, however, frequently becomes ineffective due to a loss of filtering area as well as the subsequent loss of flow rate due to the buildup of particulate matter on the surface of the filter and/or inside the matrix of the filter material. Such a phenomena is particularly true in the filtration of solutions such as blood plasma containing lipid micelles and/or precipitates formed by pH or ionic strength alterations. Such problems also occur when filtering cooking oil to remove impurities such as crumbs, flour particles and carbonized materials that cause or aid the formation of free fatty acids which turns the cooking oil rancid.

Although it is possible to increase surface area of a filter to compensate for loss of filtration area, such increased surface area only contributes to the loss of filtrate due to non-specific adsorption by the filter. Depth filters are frequently used to achieve a higher flow rate or to increase the amount of precipitate retained before the filter is plugged, but with such depth filters the loss of material from the filtrate may be even greater due to absorption by the filter material (as with cellulose type materials) or by retention of solution within the pore spaces themselves. When filtering small volumes of biological solutions, the loss of material in the filtrate often proves to be a serious problem, particularly when the solution to be recovered shows a specific loss of the protein of interest and the protein is a minor constituent of the total.

When filtering plasma containing pH or ionic strength precipitates, the loss of desired proteins may be very high due to the formation of large aggregates of materials which form a layer on the surface of the conventional filters and then further trap proteins other than those that have been precipitated.

Not only do traditional surface or depth filters retain a significant amount of filtrate, but removal and/or recovery of the precipitate from such filters is both difficult and inefficient. To facilitate removal and/or recovery centrifugation may be used instead of filtration, but the cost and time factors are substantial. Furthermore, maintaining a sterile system is a greater problem with centrifugation than with a filtration system.

There are several requirements for filters which are designed to remove precipitates from plasma. Such a filter must possess a small surface area ratio of filter medium to volume of solution to be filtered. The typical filter should also have a minimal holdup volume, a minimum flow rate of 50–100 milliliters per minute with minimal decay of that flow rate over time, and a minimal loss of desired protein in the filter. The filter should be capable of recovering precipitated material and of being sterilized. At this time, there appears to be no filter commercially available at a low cost which allows filtration of relatively small volumes of solution such as blood plasma.

When filtering hot cooking oil, the filter should also have a minimal holdup volume; a minimum flow rate of 3–5 milliliters per minute per square centimeter 50–100 psi differential pressure across the filter element at the operating temperature with a minimal decay of flow rate over time and an ability to filter large amounts of filtrate. Unlike with a plasma filter, allowing loss of small amounts of filtrate, minimizing loss of precipitate or providing a capability of recovering precipitate are not important considerations. In addition, the components of such a filter must be able to withstand temperatures of up to 300°–500° F. without any adverse effect on the filtering capacity of the filter.

It is therefore a principal object of the present invention to provide a filter for filtering solutions containing particulate material or solid particles which are difficult to process using conventional filters due to the nature of the solution.

Another object of the present invention is to provide a filter having a minimal surface area ratio to volume of solution to be filtered and which provides a minimum flow rate of 1.5–3.0 milliliters per minute per square centimeter.

Yet another object of the present invention is to provide a filter which is ready sterilizable.

Still another object of the present invention is to provide a filter the life of which is extendable without disassembly or other manual intervention.

A further object of the present invention is to provide a filter having a low non-specific adsorption of the solution being filtered.

Yet another object of the present invention is to provide a filter which has the capacity to remove and recover precipitate.

A still further object of the present invention is to provide a reusable, low cost filter which meets the above objects.

SUMMARY OF THE INVENTION

The flow-through filter of the present invention includes a two-stage valve head assembly and a filtering body. The two-stage valve head assembly controls the flow of solution into and out of the filtering body. The filtering body is designed to provide a helical flow path for the solution over a cylindrical porous membrane filter which captures the particulate matter carried by the solution being filtered. An expander tube is positioned within the membrane filter, and when connected to a pressure source, the expander tube forces solids from the pores of the membrane. The flow-through filter of the present invention achieves an extended filtering capacity due to the ability of the filter to remove and eject separated solids retained by a porous filtering membrane. The membrane clearing is made possible by an accurately controlled and metered volume of uniformly distributed reverse flow which effectively lifts the solid material out of the porous membrane and into the primary volume of the filter where a flushing medium is circulated. The flushing medium carries the solids lifted from the main membrane away, either for discard or collection. Input flow and pressure drop through the filter is used to extend and control the time between periodic clearing cycles. The structure of the rigid porous membrane provides improved uniformity of flow over the membrane to further enhance filtration.

A BRIEF DESCRIPTION OF THE DRAWINGS

FIGS. 5–7 are flow diagrams of the various operating modes of the filter of FIG. 1;

FIG. 13 is a perspective view, partially in section, of a rigid porous filtering membrane of the filter of FIG. 1;

FIG. 14 is a plan view, partially in section, of an expander tube incorporated in a filter according to the present invention;

FIG. 15 is a perspective view of the expander tube guide rod;

FIG. 16 is a perspective view, partially in section, of an alternate embodiment of the rigid porous membrane shown in FIG. 13;

FIG. 17 is a perspective view, partially in section, of an alternate embodiment of the expander tube according to the present invention;

FIG. 18 is a sectional plan view of a Venturi jet pump which can be used with the filter of the present invention;

DETAILED DESCRIPTION OF THE PREFERRED EMBODIMENTS

Figure 1:
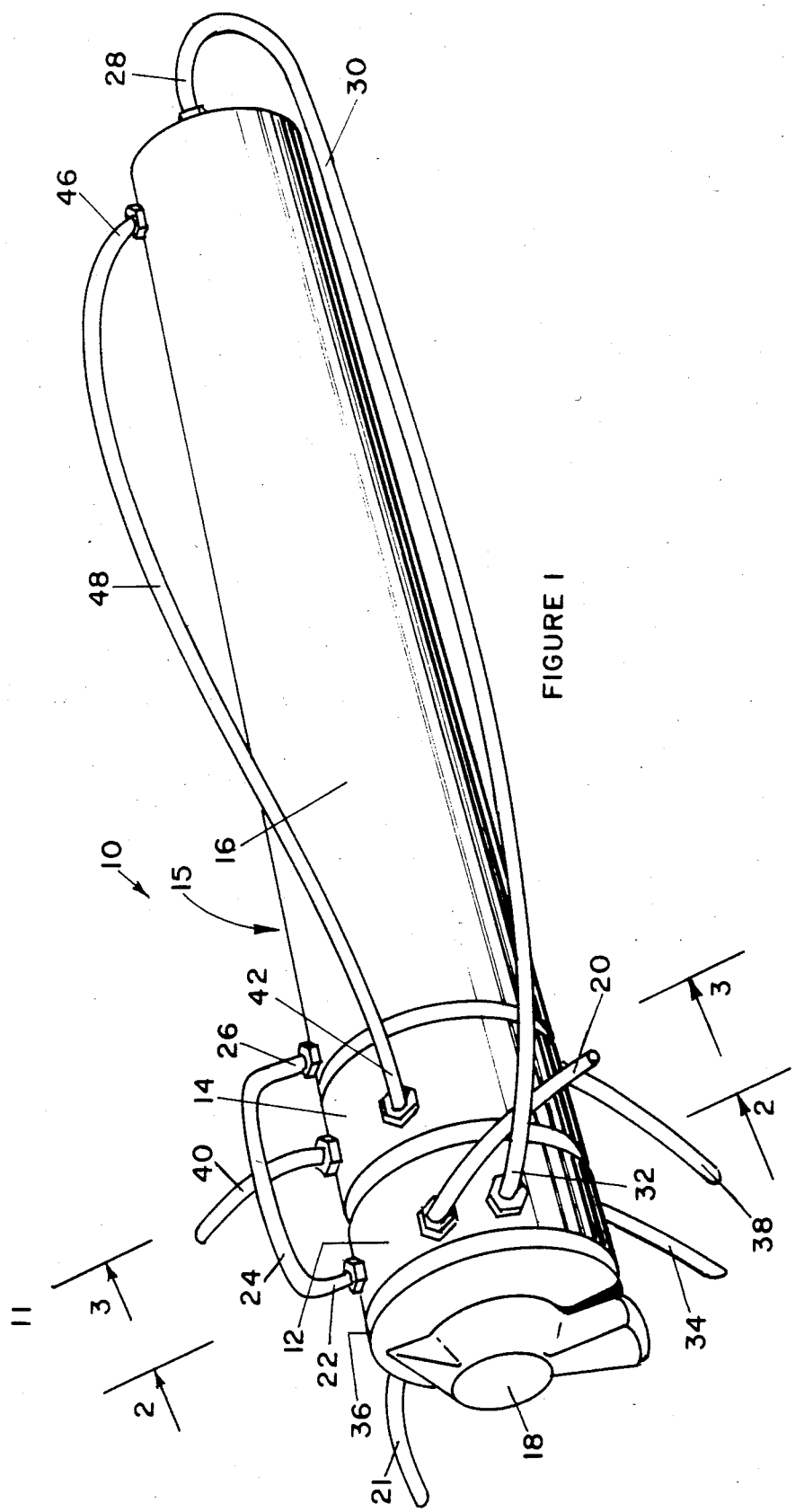
FIG. 1 is a perspective view of the filter of the present invention.

As shown in FIG. 1, the improved flow-through filter 10 of the present invention is basically comprised of two sections. The valve head assembly, designated generally as 11, includes two separate individual valve head assemblies 12 and 14. The main filtering body 15, the cylindrical housing 16 of which is shown in FIG. 1, is positioned adjacent and flush with one end of the valve head assembly 14. A switching member 18 for switching between filter operating modes is rotatably mounted on the opposite end of the valve head assembly 12. The various valves and associated hosing connecting the two valve head sections 12,14 and the cylindrical housing 16 of the main filtering body 15 are best described with reference to FIGS. 2 and 3.

Figure 2:
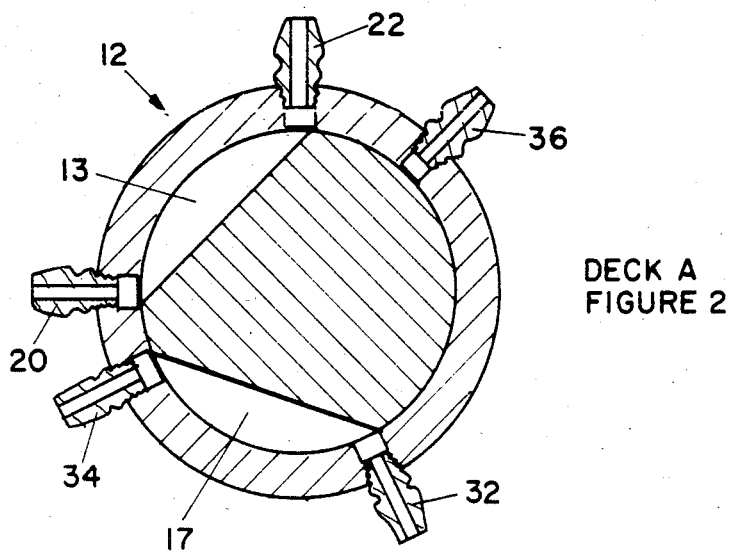
FIG. 2 is a cross-sectional view taken along line 2—2 of FIG. 1.

Turning now to the first valve head assembly 12 shown in FIG. 2, a valve port 20 is provided through which a solution to be filtered enters a connecting chamber 13 in the first valve head assembly 12. When the filter is in a filtering mode, the solution which enters valve inlet port 20 exits the valve head assembly 12 through a valve outlet port 22 and travels through hose 24 into the main filter body 15 through inlet port 26.

The filtrate, after passing through the main filtering body 15, exits the main filtering body 15 through an outlet port 28 to which one end of hose 30 is connected. The opposite end of hose 30 is connected to the filtrate inlet port 32 which leads to connecting chamber 17 of the valve head assembly 12. Filtrate exits valve head assembly 12 through outlet 34. As is apparent from FIG. 2, when the filter is in a filtering mode, the solution handling valve ports 20 and 22 and connecting chamber 13 are isolated from filtrate handling valve ports 32 and 34 and connecting chamber 17. A fifth valve port 36 of valve head assembly 12 is provided as an inlet for a flush medium during the membrane clearing cycle.

Figure 3:
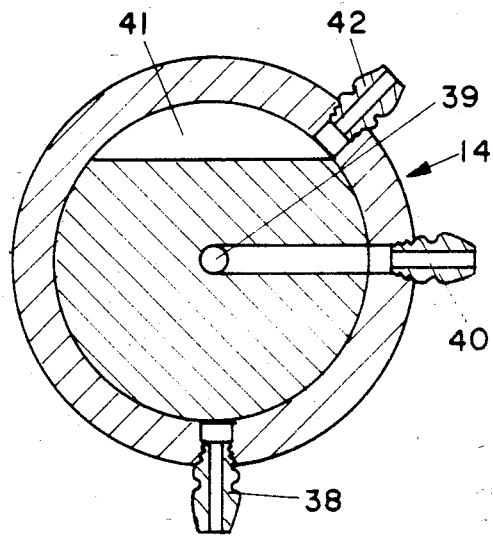
FIG. 3 is a cross-sectional view taken along line 3—3 of FIG. 1.

The second valve head assembly 14, as shown in FIG. 3, contains three valve ports. Inlet port 38 is used for providing a pressure source for use by an expander tube 56 which will be described in detail below. Port 40 is an outlet port for the backflush or clearing medium, and during filtration, port 40 acts as an outlet port for releasing pressure from the expander tube 56. During filtering, solution recycling is achieved as unfiltered solution leaves the main filter body 15 through port 46 and travels through hose 48 to inlet port 42 where it enters connecting chamber 41.

Figure 4:
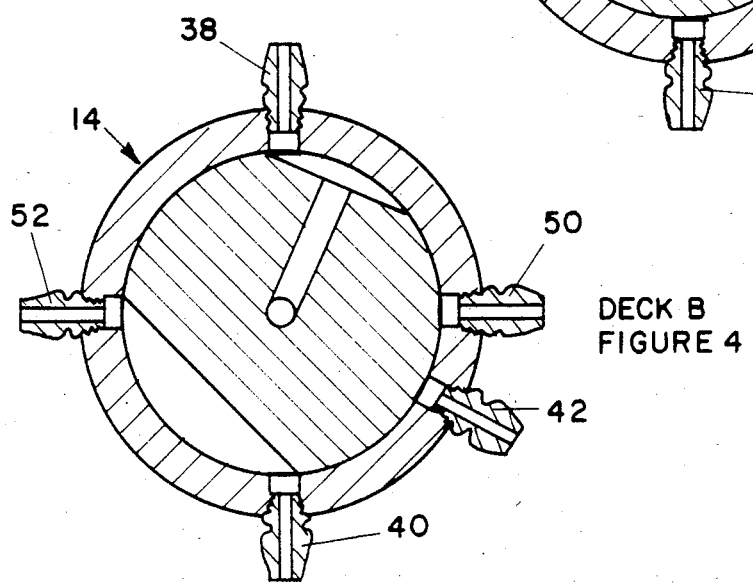
FIG. 4 is a cross-sectional view of an alternate embodiment of the filter of the present invention which corresponds to the view of FIG. 3.

FIG. 4 shows an alternate embodiment of the valve head assembly 14 for a filter of the present invention utilizing an exterior secondary storage chamber. In the valve head assembly 14 shown in FIG. 4 ports 38, 40 and 42 serve the same functions in the FIG. 4 embodiment as they do in the FIG. 3 embodiment. As for the remaining inlet and outlet ports of this valve head assembly, port 50 provides an outlet for the pressure which actuates a plunger on an external storage chamber 90 and port 52 receives the clearing medium flushed from the main filtering body 15.

Figure 12:
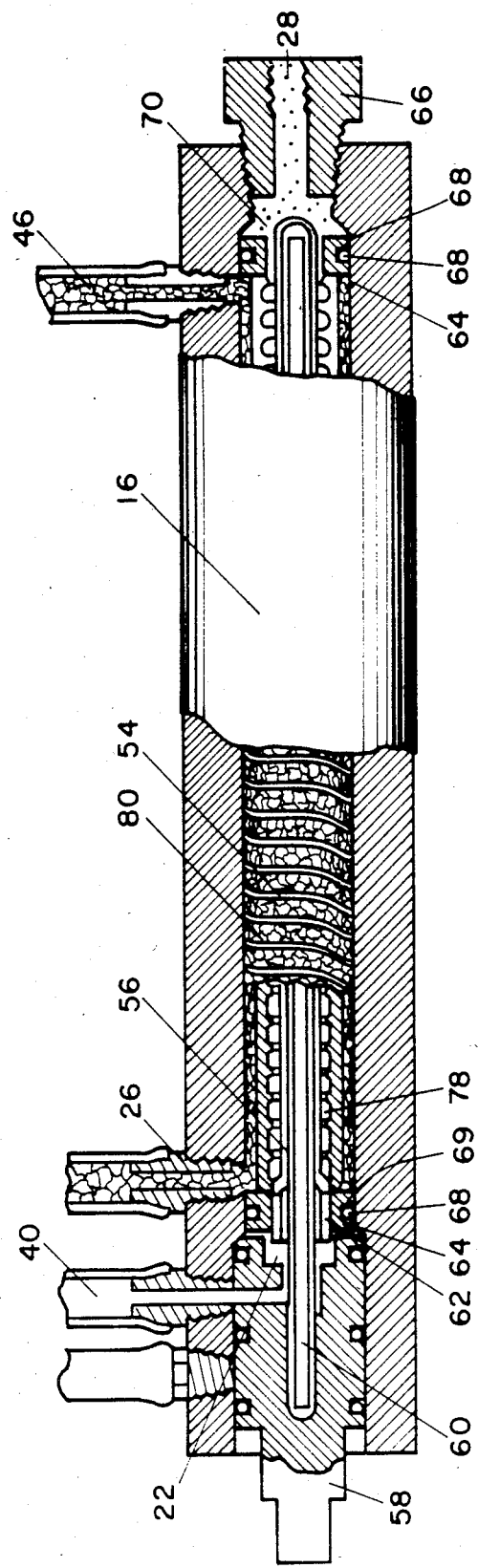
FIG. 12 is a plan view, taken partially in section, of the filter shown in FIG. 1.

The main filtering body 15 includes a housing 16 which surrounds the main filtering components. As shown in FIG. 12, the housing 16 surrounds a rigid porous membrane 54 which filters the suspended particles from the solution. Positioned within the membrane 54 is an expander tube 56. A membrane endpiece 58 connects the valve head assembly 10 to the filtering membrane 54, the expander tube 56 and a support and guide rod 60, preferably a hexagonal stainless steel rod. This guide rod 60 is positioned within the expander tube 56 for maintaining the expander tube 56 in a substantially extended position throughout the length of the rigid porous membrane 54. The expander tube 56 is connected to a pressure source (not shown) through expander tube endpiece 62. Members 64,64 located on each end of the rigid porous membrane 54, secure the membrane 54 within the main filtering body 15. O-rings 68,68, positioned within grooves 69,69 in members 64,64 seal the primary filter path at each end of the main filtering body 15. A plug element 66 is threadably attached to the cylindrical housing 16 at the end of the cylindrical housing 16 away from the valve head assembly 12. Plug 66 contains outlet port 28.

Before describing the remainder of the structure of any of the preferred embodiments of the filter, a description of the filter's operation would appear to facilitate an understanding of the various components of the filter. Although the various connections and valving arrangements contained in the basic filter system make it possible to use the filter in a number of flow mode variations, two specific modes will be discussed here which illustrate operation of the filter as a single pass, dead end system and as a recirculating system.

In the single pass, dead-end system, solution with suspended particles enters the filter through hose 21 which is connected to inlet 20 of the valve head assembly 12. The solution then travels from the valve head assembly 12 through outlet 22 and hose 24 before entering the primary filter path 80 through port 26. Solids are retained by the membrane 54 as the filtrate passes through the membrane 54 into the space between the membrane 54 and the expander tube 56. The filtrate exits the filter through outlet 28, and at this point, can be either collected or discarded.

The flow rate through the main filter path 80 is maintained by an increase in pressure as the precipitate progressively closes membrane pores. When the pressure across the membrane increases to a level where the flow rate begins to decrease, the filter backflush cycle is initiated to remove the solids on and in the membrane 54.

In one embodiment, the backflush cycle is initiated by adjusting switching member 18 thereby altering the connections between the various inlet and outlet ports of the valve head assembly 10. The flow diagrams in FIGS. 5, 6, and 7 demonstrate the various changes in the valve connections. As discussed above and as shown in FIG. 5, during filtering a solution to be filtered enters the filter through inlet 20 of the valve head assembly 12 and exits the valve head assembly 12 through outlet 22. Outlet 28 is open for collection at this time, but outlet 46 of the primary filter path is closed. The pressure source port 39 to the expander tube 56 is open to outlet 40, as seen in FIG. 3, so that there is no pressure on the expander tube 56 thereby maintaining the expander tube 56 at its minimum volume. Backflush/clearing medium inlet 36 is closed as is the expander tube pressure source inlet 38.

Turning now to FIG. 6, the flow control of the filter is shown when the switching member 18 (as shown in FIG. 1) is rotated partially in the clockwise direction. With this rotation, inlet 20 is bypassed to outlet 34 so that the solution to be filtered does not enter the filter (the solution flow may be discontinued at this point, if desired). Clearing medium enters the valve head assembly 12 through now open port 36 and travels to the primary filter path 80 from port 22 through hose 24 into port 26. Residual solution and loose precipitate is removed by the clearing medium as it exits the primary filter path 80 through outlet 46 and hose 48 to inlet 42 which serves as the solution recycling inlet of the valve head assembly 14. The cleared material is then available for discard or collection. During this cycle, the fitrate exit port 28 is closed in order to force the solution or clearing medium through outlet 46.

Figure 19:
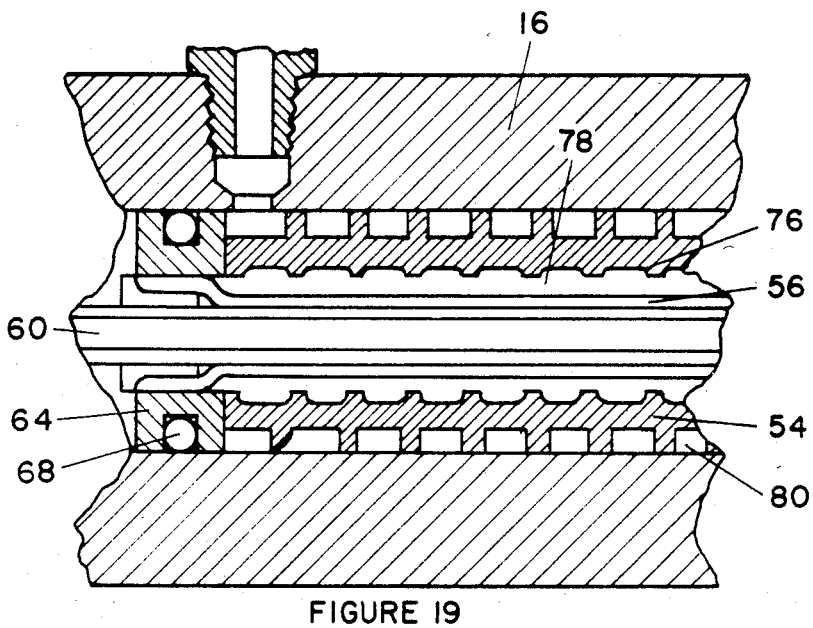
FIGS. 19–21 are enlarged, cross-sectional views of a portion of the filter of the present invention, as shown in FIG. 12, which show the action of the expander tube during the backflush/clearing mode.
Figure 20:
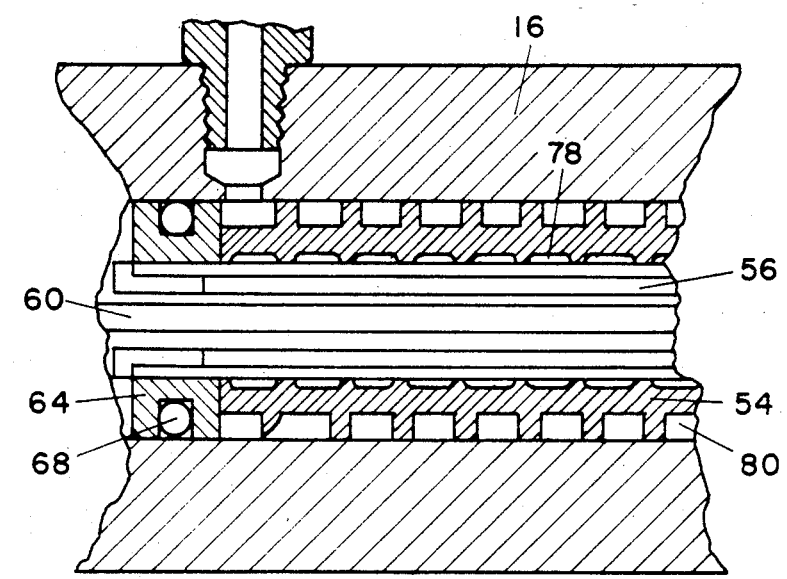
Figure 21:
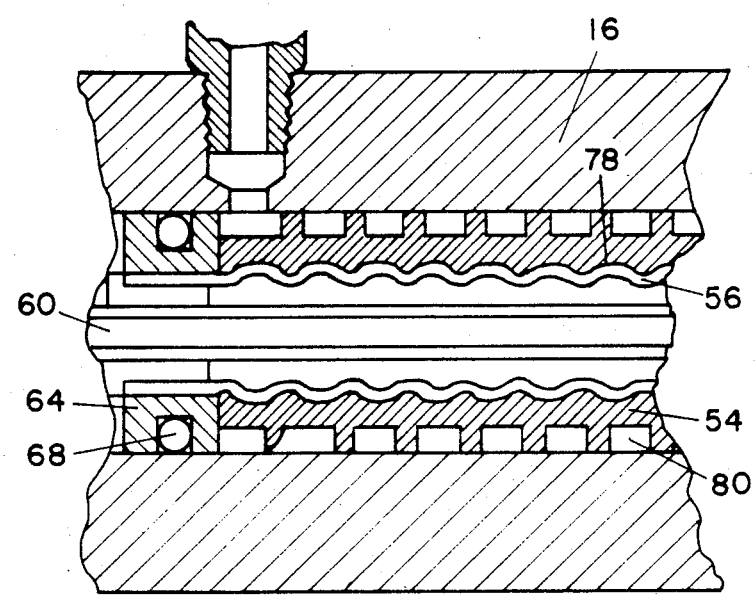

Since this method of clearing is not sufficient in itself, a further clearing mechanism is incorporated into the filter. By rotating the valve control to its furtherest point in the clockwise direction, a "backflush" step is initiated. Referring to FIG. 7, a pressure source is connected via an inlet port 38 through expander tube port 39 connected to the expander tube 56. Expander tube port 39 is now closed to the atmospheric outlet port 40. The pressure causes the expander tube 56 to inflate from its minimum volume, as also shown in the cross-sectional views of the relationship between the expander tube and the porous membrane of FIG. 19, to the point where it makes contact with the circular annular ridges 76 on the interior of the membrane 54 (see FIGS. 13 and 20). A series of equal compartments 78 are created along the length of the membrane 54. The annular volumes created within these compartments 78 are then forced back through the membrane 54 as the expander tube 56 continues to expand radially, as shown in FIG. 21. Solids from the membrane pores are uniformly expelled into the flowing rinse stream of the primary filter path 80 from which they exit the filter through port 46. The precise, distributed, metered reverse flow uniformly clears the membrane 54 to restore filter flow efficiency. A key feature of the present invention is that the circular primary path 80 resulting from the helical structure of the porous membrane 54 facilitates particulate removal due to the combined radial velocity of the solids with the circumferential stream flow. This results in turbulent flow and tangential shear to remove and hold the solids in suspension.

The solution to be filtered enters the primary filter path 80 from inlet port 20 via port 22 and exits through port 28 for collection in the single pass, dead-end mode of filtration. A variation of this mode of filtration is a multiple pass, dead-end mode of filtration in which solution enters the primary filter path 80 through inlet port 20 via port 22, exits through port 28, and is circulated back to a connecting chamber 17 through port 34. During the backflush/clearing cycle the solution to be filtered is bypassed directly to inlet port 34 from port 20. The solution is filtered until all precipitate is removed from the solution in the storage reservoir. A pressure gauging device (not shown) is used to determine when all the precipitate is removed from the solution based on the solution freely passing through the filter membrane without causing any increase in pressure due to buildup of particulate on and/or in the membrane.

In the recirculating mode, the valving remains as shown in FIGS. 2 and 3, but the primary filter path outlet port 46 is connected via hose 30 to the valve head assembly 10 at port 34 so that the filtrate exiting through outlet 28 passes through port 34 and enters the connecting chamber 17. The filtrate continues to exit from the membrane space 70 through the port 28. The effect of altering the connections in this fashion is to recirculate the unfiltered solution as it passes through the primary path but has not passed through the membrane. Eventually, all the solution is filtered except that which contains so much particulate matter that it is unable to physically flow through the filter. A concentration of starting material thereby results, and the filter yields two products: a concentrated solution of particulate matter and a clear filtrate.

An example of a solution for which such a recirculating mode would be the preferred mode of filtration would be cooking oil, and such a recirculating mode is preferred when filtering cooking oil for a number of reasons. First, it is undesirable to introduce a backflush/clearing medium into the oil. There is also a great deal of particulate matter that must be removed so that a self cleaning or reusable filter is required to keep the costs of filtration at a reasonable level. The recirculating mode allows the oil to be used as its own clearing medium, with the expander tube 56 acting in the same fashion as in the single pass dead end mode of filtration to lift the solids trapped in the membrane back into the primary filter path 80 where they are carried back to a storage reservoir. Although some oil is lost in this type of filtration, it is more than offset by the cost savings of having a self-cleaning reusable filter.

Although the above example using cooking oil does not use a separte backflush/clearing medium it is possible to recirculate the starting solution through the filter until the pressure increases, the flow rate decreases, and clearing is required. A different clearing medium may also be used and the precipitate discarded without altering the connections which allow passage of unfiltered solution from the primary filter path back through the storage reservoir. This may be important if a small pore size filter element 54 is used and very high flow rates through the filter housing are necessary for the functioning of other components of the system.

In situations where minimum loss and/or dilution of the filtrate is required, such as where the total volume is so small that the addition of a few milliliters of rinse solution per clearing cycle becomes a significant factor, a modified filter is used which has a transfer storage chamber 90 as shown in FIGS. 8-11. The medium in the primary filter path 80 between connections 22 and 46 is conserved in the storage chamber during the backflush/clearing cycle.

Figure 8:
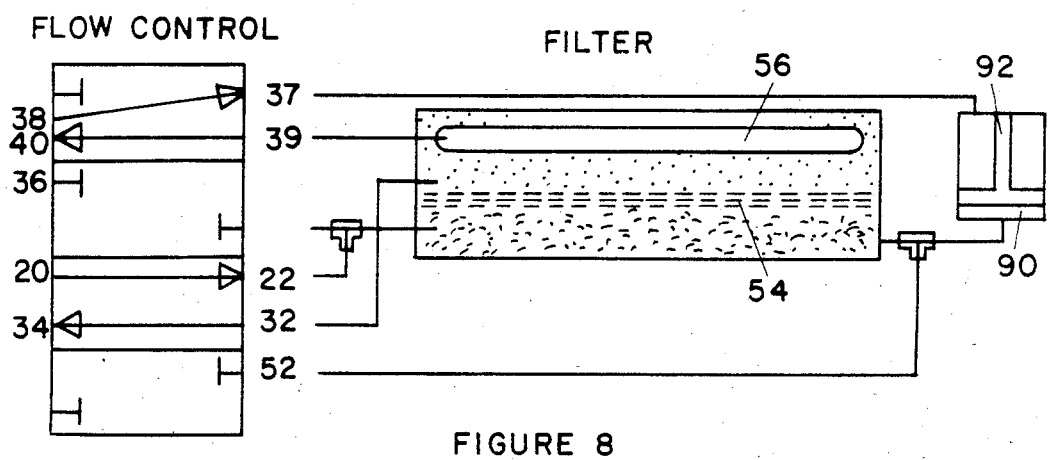
FIGS. 8–11 are flow diagrams of the various operating modes of an alternate embodiment of the filter of FIG. 1 which utilizes a storage chamber attached to the filter.
Figure 9:
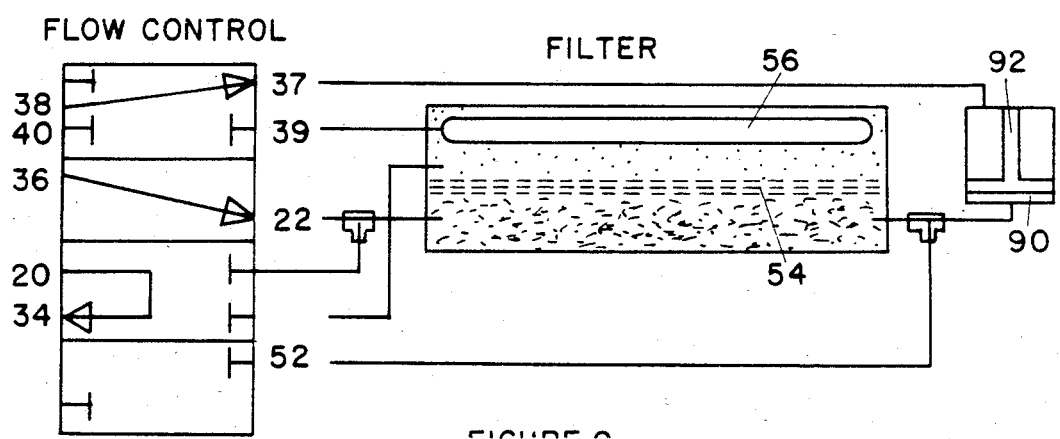
Figure 10:
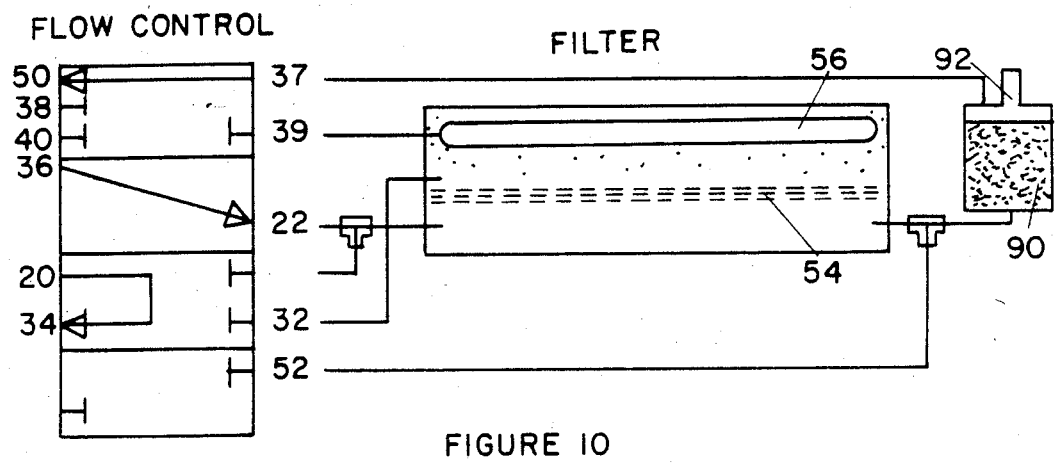

The storage chamber 90 operates in the nature of a syringe with the direction of differential pressure actuating a plunger to control the volume connected to the primary filter path. A flexible bladder will perform in a similar manner. As shown in FIG. 8, during filtration, the expander tube pressure source inlet port 38 is connected to the plunger 92 in the storage chamber 90 via port 37. The pressure forces the plunger 92 down into the storage chamber 90 so that the solution is unable to enter. Turning to FIG. 9, as the switching member is rotated to initiate membrane clearing, the primary filter path 80 is closed to the solution being filtered and is connected to the backflush/clearing medium inlet port 36 through port 22. As the valve head is rotated further, as shown in FIG. 10, the pressure source inlet port 38 is disconnected from connection 37 leading to the plunger 92. Port 37 is connected to the drain outlet port 50 which is at atmospheric pressure. Pressure from the incoming backflush/clearing medium forces the solution within the primary filter path into the storage chamber 90. The piston-like plunger 92 now travels to the opposite end of the chamber 90 since there is no force from the pressure source to prevent it from doing so. The volume of the storage chamber 90 is sized as needed to optimize loss or dilution of the retentate. Over-compensation will dilute the retentate with backflush/clearing medium while undercompensation will result in loss of some of the unfiltered solution to the backflush/clearing medium.

Figure 11:
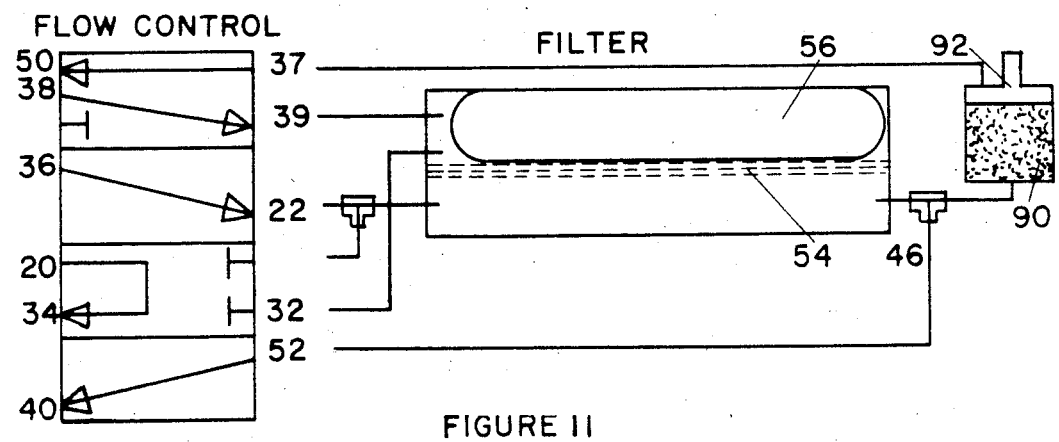

In the next step, shown in FIG. 11, the expander tube 56, now connected to the pressure source inlet port 38 through source inlet 39 has expanded to force trapped material back through the membrane. This process is identical to the process described in the normal filtration cycle using a single pass, dead-end system.

When clearing is complete, the valve head control 18 is rotated back to the filtering position. This restores all the connections necessary to connect the solution to be filtered to the primary filter path 80 and terminates the incoming flow of backflush/clearing medium. In the filter utilizing a storage chamber 90, the pressure source inlet 38 is again connected to the plunger 92 through port 37 and the solution within the storage chamber 90 is forced back into the primary filter path 80. The backflush/clearing medium remaining in the primary filter path at the end of the clearing step is forced out of the filter path through outlet 46 to the clearing medium drain port 40 via port 52. At that point, filtration continues as described above.

In another embodiment of the filter described above, a Venturi pump of the type shown in FIG. 18, may be added to the single pass, dead-end filter to increase the tangential shear rate across the primary face of the porous membrane 54. By holding an increased number of particles retained by membrane 54 in solution, the time of filtration between backflush/clearing cycles is extended. In the single pass, dead-end mode of filtration, the flow velocity in the helical flow path diminishes to zero at the terminal end of the helix as a function of the passage of the filtrate through the membrane. Tangential shear can be increased by inserting a Venturi jet pump between the valve port 22 and the hose 24 which leads to the primary filter path. The low pressure at Venturi pump 100, which is connected to the hose 48 which leads from the primary filter path 80 via a port 46, results from the high velocity jet stream from high pressure inlet port 104 through the high velocity jet through throat 106 to the mixed stream jet throat 108. This flow creates a suction in chamber 105 which in turn provides suction at inlet 100. The expanding section 110 of the Venturi jet pump 99 transforms the velocity of the stream to higher pressure which enters the filter primary path via port 26. This low pressure in turn creates a recirculation of the fluid in the primary filter path with a corresponding increase in tangential shear over the surface of the membrane. The combination of the recirculation resulting from the addition of the jet pump with the surface shear turbulence from the helical flow path provides a single pass filter which approaches the filtering efficiency of the recirculating system but with greater simplicity, lower costs, and less frequent clearing cycles.

The filter, shown in FIG. 12, comprises a cylindrical piece of smooth bore, when used with a contoured, cylindrical membrane, and the connections for the valve head, inlet and outlet ports, the membrane 54, the expander tube 56, and the guide rod 60. The housing could just as easily be constructed so as to eliminate the need for creating the helical flow path on the surface of the membrane. In such a case, the membrane 54 would have a smooth external surface radius.

In another embodiment, not shown, the filter housing consists of two flat, square pieces with a spiral cut into one piece which is then placed above a porous membrane shaped like a disc rather than a cylindrical tube. Connections are made into the top and bottom pieces that correspond to those previously described. The spiral retains the advantages of the helical flow path as in the tubular or cylindrical filter. The expander tube 56 is altered to a more bladder-like configuration so that the backflush/clearing features of the cylindrical filter were retained. The housing can obviously be altered as to length, diameter, means of attaching the valve head assembly, etc.

The expander tube 56, shown in FIG. 14, generally comprises a smooth, thin-walled, elastic tube of a diameter and length carefully designed to conform to the interior surface of the cylindrical membrane 54. When using the filter for filtering cooking oil, the expander tube 56 should preferably be made from a silicone rubber which continues to function when exposed to high temperature solutions. A suitable material is a silicone rubber sold by Dow Corning under the trademark Silastic which continues to function up to 500° F. In an alternate embodiment, the expander tube 56 is a variable cross-section expander tube used with a cylindrical membrane 54 as shown in FIG. 16 having a smooth interior. As shown in FIG. 17, such an expander tube 56 includes thick sections or ribs 94 alternating with thin sections 96 along the length of the tube 56. Expansion of the tube 56 from internal pressure causes the ribs 94 to contact the smooth inner surface of the membrane 54 (see FIG. 16) creating a series of isolated annular volumes. The thin sections 96 continue to expand forcing the volume in each annular ring to flow outwardly through the membrane 54. In this way, the thick sections 94 create the annular pockets 78 and the thin sections 96 provide the force necessary to expel the material accumulated on or within the membrane 54. It is also possible to construct the expander tube 56 to be of a bladder type as described with the flat filter spiral housing.

The expander tube guide rod 60, which is shown in FIG. 15, is a hexagonal steel rod which extends the length of the rigid porous membrane. The flat surfaces of the rod serve to control flow into and out of the tube 56 and to prevent inadvertant sealing of the tube to the guide with consequential trapping of volume in the tube 56 which could restrict its ability to return to minimum volume. Although the hexagonal rod is the preferred form, any rod with one or more flat surfaces could be used to achieve similar results. No guide rod is required for the flat, spiral filter embodiment.

The embodiment of the membrane 54 shown in FIG. 13, comprises a cylindrical piece of rigid, porous membrane of a discrete pore size which has been machined or formed to include spiral ridges 82 which create a helical flow path 80 on the outside of the membrane and discrete annular ridges 76 on the interior. The cross-sectional area, the number of turns per inch of the helix (the pitch of the spiral), the number of the annular ridges per inch, the width of the annular ridges, the length of the membrane, the diameter of the membrane, and the pore size can all be varied. These variables effect the efficiency of the filter and should be optimized for the solution to be filtered. Factors such as the viscosity, the particle size, the quantity of particulate matter, and sensitivity to such factors as shear are to be taken into consideration.

A suitable material for use in manufacturing the membrane 54 is an anistropic ceramic (aluminum oxide) material sold by the Norton Company. In one form, the material is formed into a tube which has an 8 micron bulk porosity and a porosity of 0.2, 0.5 or 1.0 microns on the interior cylindrical surface of a 5 micron thick membrane. One prototype of the membrane had an inside diameter of 9 mm., the outside diamter of 13 mm. and a 9 inch length. Another suitable material is produced by 3M and consists of small glass beads bound together by an epoxy binder. The preferred material is dependent on what is to be filtered. The 3M material has a uniform pore size. The Norton material tolerates higher temperatures and may be produced with a gradient of pore sizes so that different size particles are filtered out as the solution passes through the membrane.

In an alternate embodiment of the filter membrane 54, shown in FIG. 16, the membrane 54 includes a smooth interior 86, which is used with a ridged expander tube (such as shown in FIG. 17) and a smooth exterior which contacts an outer housing containing the helical flow path. Either deviation from the membrane shown in FIG. 13 could be used without the other (i.e., a smooth interior and helical path on the exterior of a smooth exterior and ridged interior).

Figure 22:
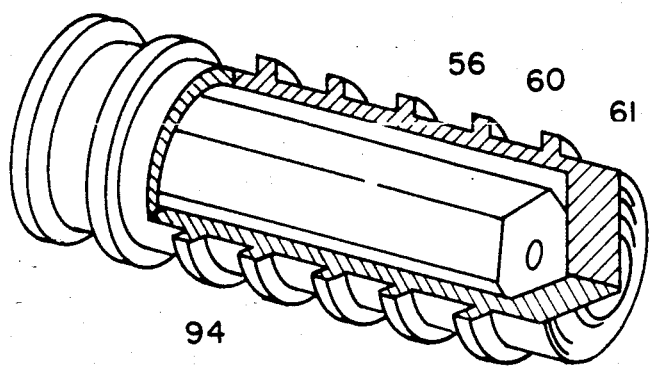
FIG. 22 is a view of a guide rod inserted in the expander tube of the filter of FIG. 23.
Figure 24:
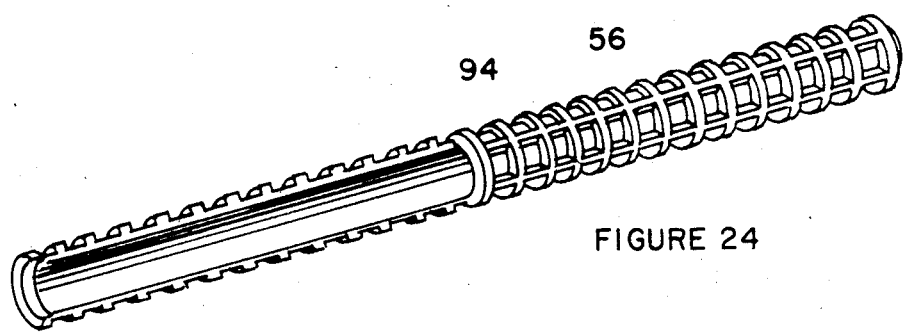
FIG. 24 is a plan view, partially in section, of a further embodiment of the expander tube according to the present invention.
Figure 23:
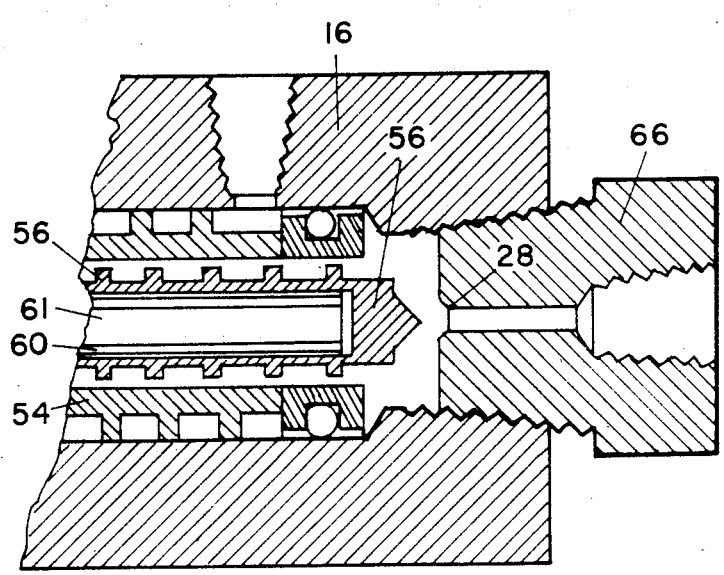
FIG. 23 is an enlarged cross-sectional view of one end portion of the filter of the present invention as shown in FIG. 12.

In a still further embodiment shown in FIGS. 22-24, an expander tube 56 including annular expander volumes created by ribs 94 on the exterior surface of the expander tube 56 is utilized with a rigid porous membrane 54 having a smooth interior surface. The guide rod 60 includes a central longitudinal passageway 61 through which pressure may be supplied to the expander tube 56. The pressure supplied to the guide rod 60 results in the expander tube 56 extending axially, initially, to close off the filtrate outlet of port 28, thus eliminating external valving. The additional segmentation which is clearly shown in FIG. 24 assures a uniform backflush flow when the porous filter element interior surface is sufficiently lodged to cause a circumferential flow in the annular segments.

A two-stage filter can be constucted using a membrane with a smooth interior underlaid with a thin, flexible porous membrane supported by a rigid screen support (such as a cellulose acetate filter or an ultrafiltration membrane) with a ridged expander tube. Large particles are retained by the rigid porous membrane and the small particles which passed through that filter are retained by the second, thinner membrane with a small pore size. By placing the larger pore size material with greater capacity in the flow path prior to the smaller pore size material, the filter can continue to be cleaned using the backflush/clearing cycle as previously decribed. A similar variation uses only the flexible porous membrane held between rigid screen supports. The primary filter path is on the inside of the filter housing and the backflush/clearing is accomplished with the previously described ridged expander tube.

In the following non-limiting examples, particular uses of the above-described filter are described in detail.

EXAMPLE 1

Human ACD plasma containing a precipitate created by alteration of pH and ionic strength was filtered through the basic filter in a single pass mode. The precipitate comprised approximately 10% of the starting volume and consisted mainly of euglobulin proteins such as fibrinogen, Immunoglobulin M and Immunoglobulin G.

The filter utilized in this example comprised a cylindrical polycarbonate housing containing a tubular machined membrane of porous glass bubble bound with epoxy resin surrounding a latex rubber expander tube centered on a hexagonal stainless steel guide rod. The housing was approximately six inches long, with an inner diameter of ½ inch and an outer diameter of 1 and ¼ inch. The machined membrane was approximately 5 and 5/16 inches in length with a nominal void volume of 30%, a nominal pore size of 8 microns, and an absolute cutoff of 15 microns. The latex rubber tube had an outer diameter of ¼ inch, an inner diameter of 3/16 inch and a length of approximately 5 and 5/16 of an inch.

Three hundred milliliters of plasma containing precipitate were fitered at a flow rate of 30 milliliters per minute using a Cole-Parmer peristaltic pump. Pressure at the inlet of the fiber was monitored using a pressure gauge. The maximum pump pressure possible was 25 psi. Backflush/clearing medium was deionized water at a pressure of 15 psi into port 36 of the filter. A nitrogen pressure source for the expander tube at port 38 was set at 25 psi. The hose connections to the pump and filter were made using silicone tubing.

The filter described above easily filtered all three hundred milliliters of plasma, only requiring two backflushes. The capacity of the filter, which is measured when the flow rate decreases significantly, was approximately one gram of dry weight of proten precipitate. Each backflush removed 0.37 grams of dry weight protein precipitate. (0.3696 grams for the first backflush and 0.3795 grams for the second backflush.) Analysis of the filtrate showed 89% of the starting protein, 85% of the starting albumin, 39% of the starting IgM and 56% of the starting IgG. The two backflushes contained 3.2% of the protein, 4% of the albumin, 28% of the IgM, and 12% of the IgG. The remaining precipitate, mostly IgM, was retained on the surfaces of the storage reservoir and tubing.

As can be seen from the above results, the filter according to the present invention has a very high capacity for the selective removal of a viscous, tenacious precipitate from plasma. Conventional dead-end filters with the same and/or larger pore size and surface area plug after only 20-30 milliliters of precipitated plasma. This same filter was used to process not only this particular precipitated plasma but a total of several liters of precipitated plasma containing precipitate formed not only by changes in pH and ionic strength but also by the addition of salting out agents such as ammonium or sodium sulfate as well as plasma containing degradation products and large amounts of lipid. The filtration of these various plasmas occurred over a number of weeks with no difficulty in continued reuse of the filter due to problems of clearing or cleaning out the filter.

EXAMPLE 2

As discussed above, the oil or shortening used in cooking food products is subject to deterioration in quality due to build up of fatty acids creating a rancid flavor. In addition, this build-up of fatty acids results in a reduced shelf life for stored products. The build-up of fatty acids is the result of food particles left in the oil when the cooking cycle is completed which subsequently carbonize and act as catalysts in the degradation of hydrocarbons into fatty acids. Removal of these particles by filtration can extend the useful life of the oil virtually indefinitely.

Figure 25:
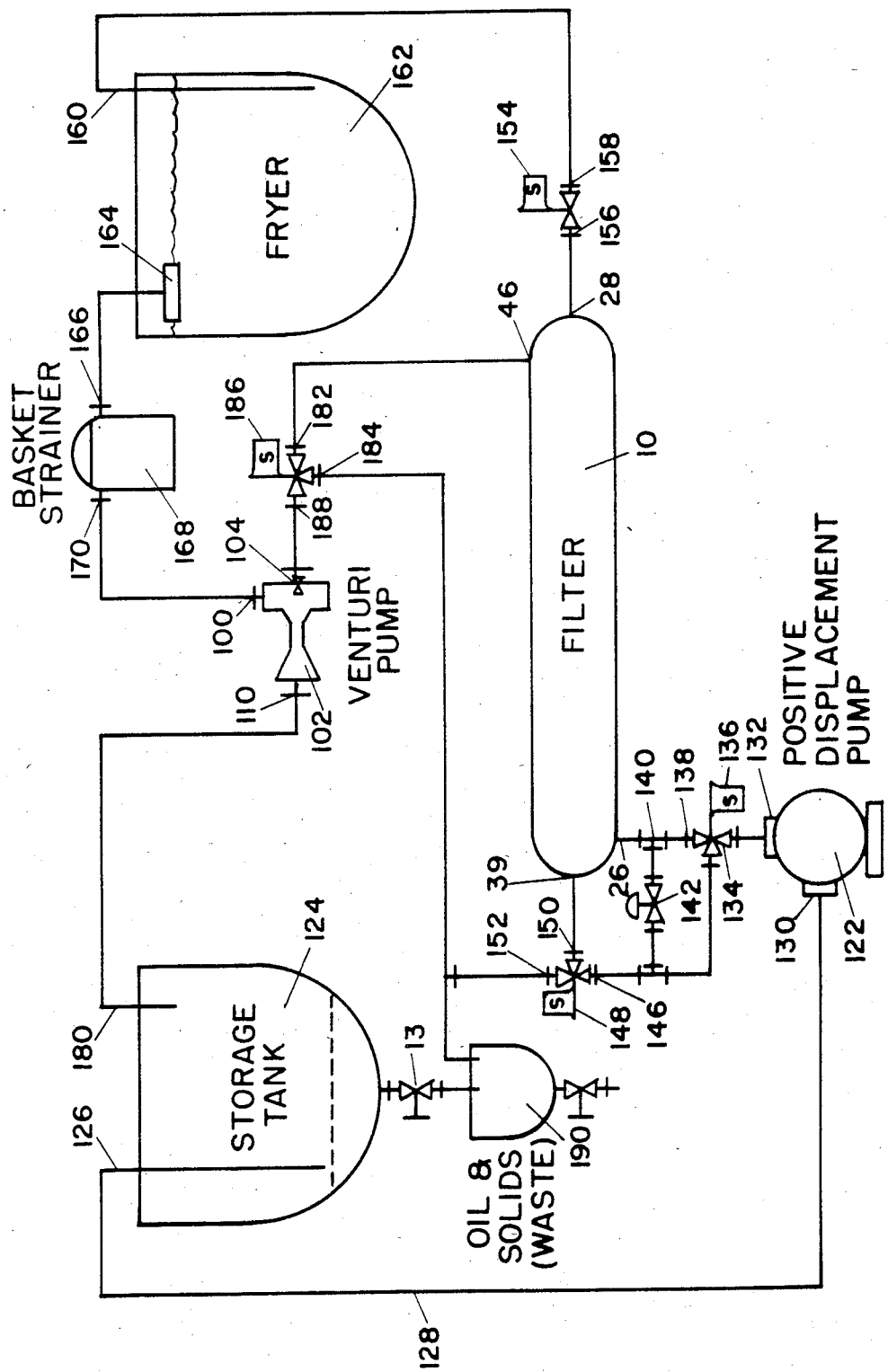
FIG. 25 is a schematic diagram of a system utilizing the filter of the present invention to filter cooking oil.

As shown in the flow diagram of FIG. 25, the filter of the present invention performs quite well in an automatic continuous filtration system. A positive displacement pump 122 draws oil from the storage tank 124 through port 126, line 128 and port 130. Pump 122 discharges a constant volume through port 132 to the inlet port 134 of 3-way solenoid valve 136 and is in turn routed through normally open port 138 to the filter primary path inlet 26. Pressure regulator 142 is connected between ports 138 and 26 by tee connection 140 and is manually closed when pressure at port 138 exceeds pressure at 144. The oil which passes through the porous membrane 54 of the filter 10 is discharged through port 28 to the inlet of the two-way solenoid valve 154 for discharge into fryer 162 by outlet 160. Oil level in the fryer is maintained by skimmer 164 which has a reduced pressure-suction to remove oil, food particles and air as the level is maintained. Most food particles detached from the cooking food rise to the surface of the hot oil due to moisture and air contained in them. Further cooking of the particles results in the particles surfacing. Thus skimming is an effective filtration supplement.

The oil removed by skimmer 164 enters basket strainer 168 by way of port 166 for retention of the larger food particles. The mixture exits through port 170 to inlet 100 of the Venturi pump 102 for return by a port 110 through port 180 of the storage tank 124. The Venturi pump 102 is driven by the oil discharged from the outlet port 46 of the filter 10. This oil is recirculated oil which did not pass through the porous membrane 54 and which enters solenoid valve 186 through inlet port 182 to normally open port 188 thereby powering Venturi pump 102 through velocity port 104. In the normal filtration mode, the solenoid valves 136, 158, 186 and 148 are all deenergized. The inlet 150 of solenoid valve 148 is connected to port 39. The interior of the expander tube 56 in the filter 10 is connected through normally open discharge port 152 to atmospheric pressure storage tank 190 for waste collection. In this state, the expander tube 56 is at minimum volume.

The backflush cycle for cleaning the porous membrane filter 54 is initiated by an increase in the discharge pressure of pump 122 at port 132 which results from a decrease in flow through the porous membrane 54 of the filter 10. The pressure switch activated by the pressure rise at port 132 actuates a time clock for the back flush cycle. Valves 136, 148, 158 and 186 are simultaneously energized. Flow from pump 122 through valve 136 is through port 134 to port 144 with port 138 now being closed. For valve 148, port 146 opens to port 150 to pressurize the expander tube 56 through port 39 with port 152 being closed. Pressure actuated valve 142 is closed until the pressure at filter inlet 26 decreases below expander tube 56 pressure at port 39 by the present differential pressure selected for the reverse flow through the porous membrane 54. Material lifted from the porous membrane 54 by the backflush is carried from the primary filter path 80 by a port 46 to inlet port 182 and out port 184 of the solenoid valve 186 to the now open waste storage tank 190. During the backflush cycle, flow through the Venturi pump 102 ceases due to the closure of port 188 of the valve 186. Valve 154 is closed during the backflush so that the volume of filtrate contained in the filter 10 is available for the reverse flow through the porous membrane 54. Flow through the pressure regulator valve 142 is restricted by the back pressure in the filter primary path 80 resulting from the expansion of the expander tube 56 creating filtrate flow through the porous membrane 54 for discharge to waste collection tank 190 by a valve 186 and port 46. On full expansion of the expander tube 56, flow through the filter primary path 80 is sustained by the supply from valve 142. The total time of the backflush is selected so that the material removed from the porous membrane 54 is essentially all returned to the waste storage tank 190. On completion of the backflush cycle, the time clock de-energizes the solenoid valves to return the system to normal filtration.

Although this example is in reference to hot cooking oil, the present invention may also be used with used motor oil which must be cleaned of particulate matter prior to further recycling.

The foregoing invention has been described with reference to its preferred embodiments, and a number of non-limiting examples. Although variations and modifications will occur to those skilled in the art, it is intended that such variations and modifications fall within the scope of the appended claims.

What is claimed:
1. A reusable, flow-through filtering apparatus for removing particulate matter from a liquid solution comprising:

inlet means through which the solution to be filtered enters a primary filter path through the apparatus;

first outlet means through which filtrate exits said apparatus;

second outlet means through which filtered particulate matter exits said apparatus;

a filter body surrounding and housing a porous rigid filtering means, said filtering means allowing filtrate to pass through its pores and causing particulate matter to lodge on an outer surface of the filtering means and within pores of said filtering means;

non-rigid expanding means positioned inside said filtering means, said expanding means when supplied with pressure from a pressure source expanding first so as to form discrete compartments along the length of the filter path of said filtering means and secondly so as to contact an interior surface of said filtering means;

switching means for switching an operating mode of said apparatus between a filtering mode and a clearing mode;

whereby when said switching means is in a filtering mode and solution enters the filter through said filtering means the filter is separted from the particulate matter with the particulate matter being captured by said filtering means, and when said switching means is switched to said clearing mode a clearing solution enters the filtering body and a pressure source supplies pressure to said expanding means thereby uniformly forcing particulate matter from said pores and said surface of said rigid filtering means to be carried away by said clearing solution.

2. The filtering apparatus of claim 1 further comprising a rigid guide means positioned inside said expanding means for maintaining said expander means in at least a partial extended position throughout the length of said filtering means.

3. The filtering apparatus of claim 2 wherein said rigid guide means comprises at least one flat surface along its length.

4. The filtering apparatus of claim 2 wherein said rigid guide means has a hexagonal cross-section.

5. The filtering apparatus of claim 1 wherein said rigid porous filtering means is a cylindrical, hollow membrane filtering means.

6. The filtering apparatus of claim 5 wherein said rigid porous filtering means further comprises a helical annular projection on the exterior surface of said rigid cylindrical filtering means.

7. The filtering apparatus of claim 5 wherein said rigid porous filtering means further comprises annular projections on the interior surface of said rigid cylindrical filtering means and said expanding means contacts said annular projections to form discrete compartments.

8. The filtering apparatus of claim 7 wherein said non-rigid expanding means comprises a smooth, projectionless, exterior surface.

9. The filtering apparatus of claim 5 wherein said non-rigid expanding means is a cylindrical, hollow expanding means.

10. The filtering apparatus of claim 5 wherein said filter body comprises a helical projection on its interior surface which contacts the exterior surface of said rigid cylindrical filtering means.

11. The filtering apparatus of claim 1 further comprising a transfer storage chamber for storing solution being filtered during a backflush/clearing cycle.

12. The filtering apparatus of claim 11 wherein volume in said storage chamber is controlled by a pressure actuated plunger, said plunger being actuated by a pressure source during a filtering process and being released during a backflush/clearing cycle.

13. The filtering apparatus of claim 1 further comprising a valve head assembly connected to said switching means for controlling flow of fluids into and out of said filtering apparatus.

14. The filtering apparatus of claim 13 wherein said valve head assembly comprises two independent valve head assemblies.

15. The filtering apparatus of claim 13 wherein said valve head assembly is positioned adjacent said filter body.

16. The filtering apparatus of claim 13 wherein connections between ports of said valve head assembly are alterable by said switching means.

17. The filtering apparatus of claim 1 wherein said porous, rigid filtering means comprises material formed from glass beads bound with an epoxy binder.

18. The filtering apparatus of claim 1 wherein said porous, rigid filtering means comprises a cylindrical tube of porous ceramic material wherein the porosity size decreases from the outside surface of said cylindrical tube to the inside surface of said cylindrical tube.

19. The filtering apparatus of claim 1 wherein said filter body comprises a first and second generally square pieces, wherein said first piece further comprises a spiral filter path, wherein said porous rigid filtering means is generally disc shaped and lies between said first piece and said second piece, said non-rigid expanding means is located between said filtering means and said second piece, wherein the solution to be filtered enters through said spiral filtering path, through said filtering means, and said expanding means expands during said clearing mode under said rigid filtering means to form said discrete compartments between said expanding means and said rigid filtering means to expel trapped particulate matter from said filtering means back into said spiral path.

20. A reusable, flow-through filtering apparatus for removing particulate matter from a liquid solution comprising inlet means through which the solution to be filtered enters a primary filter path through the apparatus;

first outlet means through which filtrate exits said apparatus;

second outlet means through which filtered particulate matter exits said apparatus;

a filter body surrounding and housing a porous rigid filtering means, wherein said filtering means is a cylindrical, hollow membrane filtering means, said filtering means allowing filtrate to pass through its pores and causing particulate matter to lodge on an outer surface of the filtering means and within pores of said filtering means;

non-rigid expanding means positioned inside said filtering means, wherein said filtering means comprises a smooth interior surface and said non-rigid expanding means comprises annular ridges on its exterior surface, said expanding means when supplied with pressure from a pressure source expanding so as to contact the interior surface of said filtering means;

switching means for switching an operating mode of said apparatus between a filtering mode and a clearing mode;

whereby when said switching means is in a filtering mode and solution enters the filter through said filtering means the filtrate is separted from the particulate matter with the particulate matter being captured by said filtering means, and when said switching means is switched to said clearing mode a clearing solution enters the filtering body and a pressure source supplies pressure to said expanding means thereby forcing particulate matter from said pores and said surfaces of said rigid filtering means to be carried away by said clearing solution.

21. A reusable, flow-through filtering apparatus for removing particulate matter from a liquid solution comprising:

inlet means through which the solution to be filtered enters a primary filter path through the apparatus;

first outlet means through which filtrate exits said apparatus;

second outlet means through which filtered particulate matter exits said apparatus;

a filter body surrounding and housing a porous rigid filtering means, said filtering means allowing filtrate to pass through its pores and causing particulate matter to lodge on an outer surface of the filtering means and within pores of said filtering means;

non-rigid expanding means positioned inside said filtering means, said expanding means when supplied with pressure from a pressure source expanding so as to contact an interior surface of said filtering means;

switching means for switching an operating mode of said apparatus between a filtering mode and a clearing mode;

a valve head assembly connected to said switching means for controlling flow of fluids into and out of said filtering apparatus, wherein said valve head assembly further comprises at least one storage chamber for storing fluids entering the filtering apparatus or exiting said filter body, whereby when said switching means is in a filtering mode and solution enters the filter through said filtering means the filtrate is separated from the particulate matter with the particulate matter being captured by said filtering means, and when said switching means is switched to said clearing mode a clearing solution enters the filtering body and a pressure source supplies pressure to said expanding means thereby forcing particulate matter from said pores and said surface of said rigid filtering means to be carried away by said clearing solution.

22. A reusable, flow-through filtering apparatus for removing particulate matter from a liquid solution comprising:

inlet means through which the solution to be filtered enters a primary filter path through the apparatus;

first outlet means through which filtrate exits said apparatus;

second outlet means through which filtered particulate matter exits said apparatus;

a filter body surrounding and housing a porous rigid filtering means, said filtering means allowing filtrate to pass through its pores and causing particulate matter to lodge on an outer surface of the filtering means and within pores of said filtering means;

non-rigid expanding means positioned inside said filtering means, said expanding means when supplied with pressure from a pressure source expanding so as to contact an interior surface of said filtering means;

switching means for switching an operating mode of said apparatus between a filtering mode and a clearing mode;

whereby when said switching means is in a filtering mode and solution enters the filter through said filtering means the filtrate is separated from the particulate matter with the particulate matter being captured by said filtering means, and when said switching means is switched to said clearing mode a clearing solution enters the filtering body and a pressure source supplies pressure to said expanding means thereby forcing particulate matter from said pores and said surface of said rigid filtering means to be carried away by said clearing solution; and a Venturi pump connected to said filtering apparatus on the exterior of said filtering apparatus, said Venturi pump increasing the tangential shear rate across the primary face of said porous rigid filtering means.

23. A method of filtering particulate matter from a liquid solution comprising the steps of:

providing a rigid porous filtering means for allowing filtrate to pass through while capturing the particulate matter;

providing a non-rigid expanding means positioned within said filtering means and a pressure source connected to said expanding means for causing expansion of said expanding means;

providing ridges along the length of said filtering means between said filtering means and said expanding means;

passing the liquid solution over an exterior surface of said filtering means;

capturing particulate matter in pores and on said exterior surface of said rigid porous filtering means while allowing filtrate to pass through said filtering means;

applying a pressure from said pressure source to said expanding means to cause said expanding means to expand and contact first said ridges to form discrete compartments containing the liquid solution and secondly said interior surfaces of said filtering means thereby forcing particulate matter out of said pores of said filtering means;

passing a clearing medium over said exterior surface of said filtering means to remove the particulate matter from said exterior surface of said filtering means.

24. The filtering method of claim 23 wherein said liquid solution is forced to pass over the exterior surface of said filtering means along a helical path.

25. A method of filtering particulate matter from a liquid solution comprising the steps of:

providing a rigid porous filtering means for allowing filtrate to pass through while capturing the particulate matter;

providing a non-rigid expanding means positioned within said filtering means and a pressure source connected to said expanding means for causing expansion of said expanding means;

passing the liquid solution over an exterior surface of said filtering means;

capturing particulate matter in pores and on said exterior surface of said rigid porous filtering means while allowing filtrate to pass through said filtering means;

applying a pressure from said pressure source to said expanding means to cause said expanding means to expand and contact interior surfaces of said filtering means thereby forcing particulate matter out of said pores of said filtering means;

passing a clearing medium over said exterior surface of said filtering means to remove the particulate matter from said exterior surface of said filtering means; and connecting a Venturi pump to be in connection with said rigid porous filtering means so as to increase the tangential shear rate across the said exterior surface of said rigid porous filtering means.

26. The filtering method of claim 25 for filtering oil containing particulate matter further comprising providing a positive displacement pump to pass the oil over an exterior surface of said filtering means.

27. The filtering method of claim 26 further comprising straining the oil prior to the connection with said Venturi pump.

* * * * *